E. JONES.
Sealing Dip-Pipes of Gas Works.
No. 144,619. Patented Nov. 18, 1873.
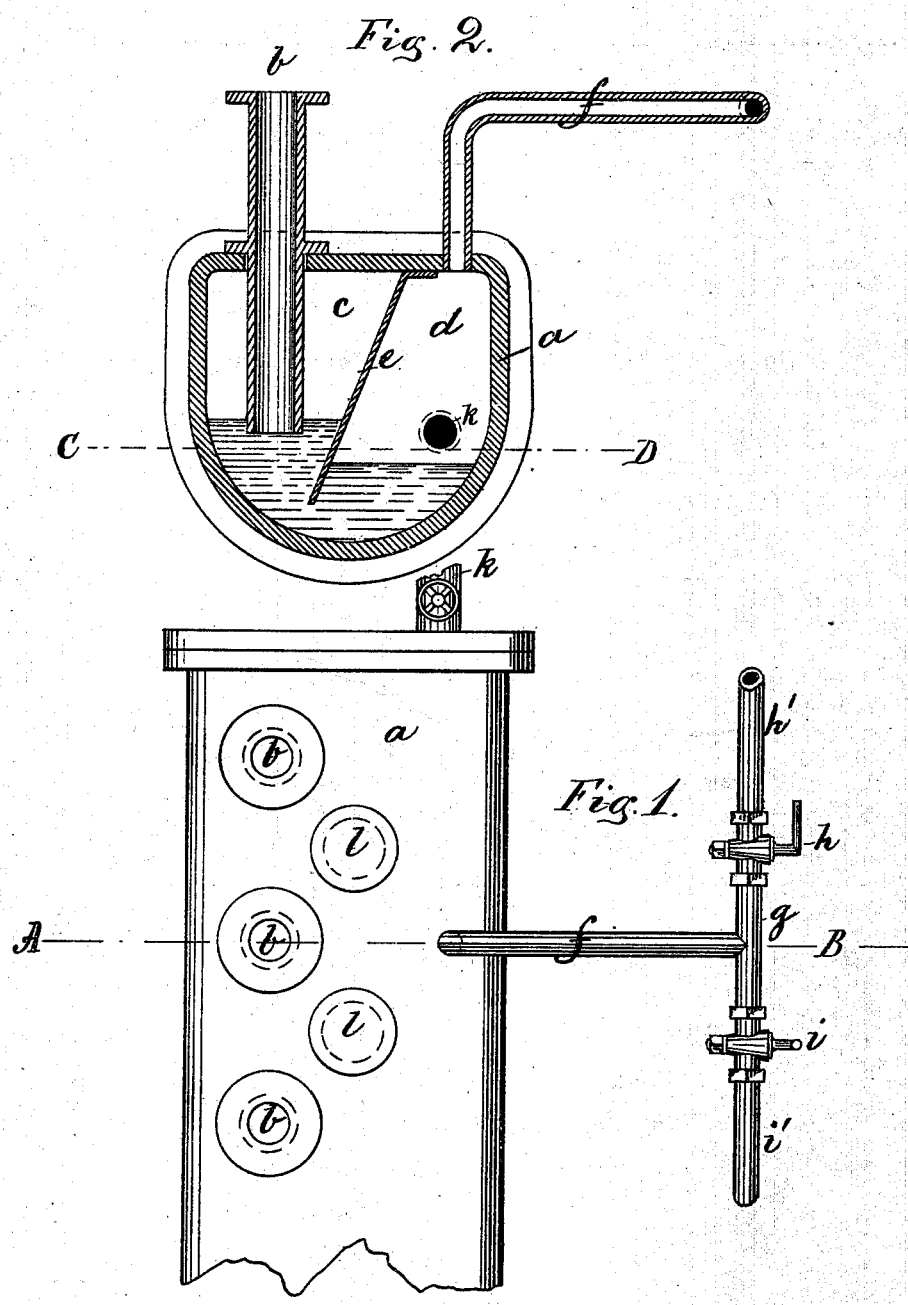
Witnesses:
George C. Phelps.
Horace M. Sproat.
Inventor:
Edward Jones.
by Alban Andrén. att.

UNITED STATES PATENT OFFICE.

EDWARD JONES, OF BOSTON, MASSACHUSETTS.

IMPROVEMENT IN SEALING DIP-PIPES OF GAS-WORKS.

Specification forming part of Letters Patent No. 144,619, dated November 18, 1873; application filed October 30, 1873.

*To all whom it may concern:*

Be it known that I, EDWARD JONES, of Boston, in the county of Suffolk and State of Massachusetts, have invented certain new and useful Improvements in Coal-Gas Apparatus; and I do hereby declare the following to be a full, clear, and exact description of the invention, such as will enable others skilled in the art to which it pertains to make and use it, reference being had to the accompanying drawings, which form part of this specification.

My invention relates to an improvement in the manufacture of coal-gas, consisting in an improved mode of raising and lowering the surface of the liquid contents of the hydraulic main, for the purpose of sealing and unsealing the dip-pipe in the hydraulic main. This I accomplish by dividing the hydraulic main in two compartments, separated by means of a longitudinal wall. The said wall does not touch the bottom of the main, as a space is left between the lower edge of said division-wall and the bottom of the main, so as to allow the liquid in one part of the hydraulic main to flow from and to the other part thereof. The dip-pipes descend into the main in the usual way. The dip-pipes are sealed by raising the pressure in that part of the main not containing the dip-pipes, whereby the liquid is raised in that part of the main where the dip-pipes are located.

The pressure I intend to utilize is that of the gas beyond the exhauster, of about two and a half inches of water.

I am able to perform the sealing and unsealing of the dip-pipes without the need of new liquid for every time the dip is sealed, as by my invention I can use the same liquid for an indefinite period.

I am aware that a patent was granted to George A. McIlhenny, dated June 18, 1867, for an apparatus to seal and unseal the dip, consisting in the employment of inlet and outlet pipes, to and from the hydraulic main, through which water was forced for every time the dip was to be sealed and unsealed. The objections to the aforesaid invention are, that a great quantity of water is yearly wasted, and a poorer gas is obtained, owing to the absorption, by the fresh water, of a great portion of rich illuminating parts of the gas. These objections I seek to avoid by so constructing my apparatus that I am able to avoid the introduction of new liquid into the hydraulic main for every time the dip-pipe is sealed and unsealed.

On the drawing, Figure 1 represents a ground plan of my invention, and Fig. 2 represents a cross-section on the line A B, shown in Fig. 1.

Similar letters refer to similar parts wherever they occur on the drawing.

$a$ represents a hydraulic main, provided with the dip-pipes $b\ b\ b$, as shown. I divide the hydraulic main $a$ in two compartments, $c$ and $d$, by means of a longitudinal wall, $e$, running from one end of the main to the other end, and connect it gas-tight to the top and ends of the main; its lower end, however, does not project as far down as to the bottom of the hydraulic main, but stops a little above it, as shown in Fig. 2, so that the liquid can flow from the compartment $c$ to the compartment $d$; the partition $e$ must, however, project somewhat below the mouth of the dip-pipes $b\ b$. A pipe, $f$, leads from the chamber $d$ to a branch, $g$, provided with two valves or cut-offs, $h\ i$, as shown in Fig. 1. From the valve or cut-off $h$ leads a pipe, $h'$, to any part of the gas apparatus beyond the exhauster, where the pressure is about two and a half inches of water. From the valve or cut-off $i$ leads a pipe, $i'$, to the chamber $c$, or to any part of the gas apparatus where the pressure of the gas is zero, or nearly so. Instead of one single pipe, $f$, for both cut-offs $h$ and $i$, I may use a separate connecting-pipe for each valve or cut-off to equal advantage.

When I wish to seal the dip-pipes I open the valve $h$ and close the valve $i$, as well as the tar-pipe $k$, thereby increasing the pressure on the liquid in the chamber $d$, the consequence of which is that the liquid is depressed in the said chamber $d$ and raised in the chamber $c$ to a position as shown in Fig. 2, whereby the mouths of the dip-pipes $b\ b\ b$ are closed. To unseal the dip I simply close the valve $h$ and open the valve $i$ and the tar-pipe $k$, whereby I establish an equilibrium of pressure on both sides of the partition $e$, and the liquid will, therefore, sink in the chamber $c$ and rise in the chamber $d$ to a position as indicated by the dotted line C D in Fig. 2.

From the above will be seen and understood that I do not need new water for every time the dip-pipes are sealed and unsealed, as the same water will answer the purpose for an indefinite period.

$k$ represents the tar-pipe, with its valve or cut-off in the usual manner, and $l\,l$ represent covers for hand-holes for the purpose of gaining access to the chamber $c$ when it requires cleaning.

I do not confine myself to any particular part of the gas apparatus to which the pipe $h'$ is connected, except that such a part shall contain a pressure of about two and a half inches of water. Likewise, I do not confine myself to any particular part of the gas apparatus to which the pipe $i'$ is connected, except that such a part shall have a pressure of zero, or nearly so.

Having thus fully described the nature, construction, and operation of my invention, I wish to secure by Letters Patent, and claim—

In combination with the hydraulic main $a$, pressure-chamber $d$, connecting-pipe $f$, one or more, and the valve or cut-off $h$, leading from any part of the gas apparatus beyond the exhauster, where the pressure is about two and a half inches of water, and the valve $i$, leading to any part of the gas apparatus where the pressure is zero, or nearly so, as herein set forth.

In testimony that I claim the foregoing I have hereunto set my hand this 17th day of October, 1873.

EDWARD JONES.

Witnesses:
 ALBAN ANDRÉN,
 GEORGE E. PHELPS.